United States Patent

Boysel et al.

[11] Patent Number: 5,551,293
[45] Date of Patent: Sep. 3, 1996

[54] MICRO-MACHINED ACCELEROMETER ARRAY WITH SHIELD PLANE

[75] Inventors: Robert M. Boysel; Jeffrey B. Sampsell, both of Plano, Tex.

[73] Assignee: Texas Instruments Incorporated, Dallas, Tex.

[21] Appl. No.: 485,170

[22] Filed: Jun. 7, 1995

Related U.S. Application Data

[60] Division of Ser. No. 233,838, Apr. 26, 1994, which is a continuation-in-part of Ser. No. 877,571, May 1, 1992, Pat. No. 5,305,640, which is a division of Ser. No. 596,841, Oct. 12, 1990, Pat. No. 5,192,395.

[51] Int. Cl.$^6$ .................................................. G01P 15/08
[52] U.S. Cl. .................................... 73/514.14; 200/61.51
[58] Field of Search .................... 200/61.45 R, 61.48, 200/61.49, 61.51, 61.53; 73/651, 652, 514.14, 514.01, 514.16, 514.36, 514.37, 514.38

[56] References Cited

U.S. PATENT DOCUMENTS

| | | | |
|---|---|---|---|
| 3,727,209 | 4/1973 | White | 200/61.49 |
| 3,764,820 | 10/1973 | White | 200/61.45 R |
| 4,855,544 | 8/1989 | Glenn | 200/61.45 R |
| 5,001,933 | 3/1991 | Brand | 200/61.45 R |

Primary Examiner—Hezron E. Williams
Assistant Examiner—Christine K. Oda
Attorney, Agent, or Firm—Charles A. Brill; James C. Kesterson; Richard L. Donaldson

[57] ABSTRACT

An accelerative force may be measured using a plurality of deflection elements (102), each deflection element (102) comprising an inertial mass (104), and at least one hinge (104) supporting the inertial mass (104) in a normal position. Application of a force to inertial mass (104) will result in the deflection of the inertial mass (104) in a first direction out of the normal position. The movement of the inertial mass (104) from the normal position stores energy in the hinges (108) which tends to move the inertial mass (104) in a second direction back to its normal position. Either the mass of the inertial mass (104), or the compliance of the hinges (108) is varied from one deflection element (102) in the array to another so that the force applied to the inertial masses (104) by simultaneous acceleration of the deflection elements (102) deflects some of the inertial masses (104). A detection means (112) senses if inertial masses (104) have deflected and produces an output representative of the applied force.

8 Claims, 4 Drawing Sheets

MICRO-MACHINED ACCELEROMETER ARRAY WITH SHIELD PLANE

CROSS-REFERENCE TO RELATED APPLICATIONS

This application is a divisional application of Ser. No. 08/233,838, filed Apr. 26, 1994, now allowed, which is a continuation-in-part of Ser. No. 877,571 filed May 1, 1992 now U.S. Pat. No. 5,305,640, issued on Apr. 26, 1994, which is a divisional of Ser. No. 596,841 filed Oct. 12, 1990 now U.S. Pat. No. 5,192,395, issued on Mar. 9, 1993.

FIELD OF THE INVENTION

This invention deals with accelerometers, more particularly with digital accelerometers.

DESCRIPTION OF THE PRIOR ART

Accelerometers in use today may be grouped into two categories. The first category uses either piezoelectric or piezoresistive materials to sense a strain induced on a component of the accelerometer by a force applied to an inertial mass. The second category measures the displacement of an inertial mass resulting from a force acting on the inertial mass. Both varieties typically have some sort of spring supporting the inertial mass.

Both of these varieties of accelerometers measure the analog response of an inertial mass to an acceleration and produce an output signal proportional to the acceleration force. The linearity and range of these accelerometers is dependent on the materials, architecture and transduction phenomena of the sensor.

Accelerometers of the prior art typically have a sensor element with a mass on the order of a gram and require hybrid techniques to integrate the transducer with the readout or addressing circuitry. This results in hybrid accelerometers that are large and very expensive by semiconductor industry standards.

These problems have led to the manufacture of a new category of accelerometers which typically have masses and springs fabricated from single crystal or polycrystaline silicon. After forming the inertial mass and springs, the silicon substrate beneath the device is removed with an anisotropic or orientation-dependent etch leaving the inertial mass supported over an open well. While this technique is an improvement over the earlier hybrid techniques, it produces an accelerometer that is approximately 1 square millimeter in size. That measurement does not include the addressing circuitry used to interrogate the accelerometer, which must be built adjacent to the accelerometer since the substrate has been removed from beneath the accelerometer.

Therefore, it is an object of this invention to provide micro-machined accelerometers that may be integrated with readout circuitry through standard semiconductor fabrication techniques.

SUMMARY OF THE INVENTION

Other objects and advantages will be obvious, and will in pan appear hereinafter and will be accomplished by the present invention which provides a structure for the detection and quantification of acceleration. According one embodiment the device comprises a plurality of accelerometers, each accelerometer comprising an inertial mass, and at least one hinge supporting the inertial mass in a normal position. Application of a force to inertial mass will result in the deflection of the inertial mass in a first direction out of the normal position. The movement of the inertial mass from the normal position stores energy in the hinges which tends to move the inertial mass in a second direction back to its normal position. Either the mass of the inertial mass, or the compliance of the hinges is varied from one accelerometer to another in the array so that the force applied to the inertial masses by simultaneous acceleration of the accelerometers deflects some of the inertial masses. A detection means senses if inertial masses have deflected and produces an output representative of the applied force.

According to another embodiment, the device comprises a substrate, readout circuitry formed on the substrate, an electrical contact supported by the substrate and connected to the readout circuitry, a support structure formed on the substrate and an inertial mass supported by hinges connected to the support structure.

An accelerative force acting on the accelerometer array may cause some of the inertial masses in the accelerometer array to deflect and touch the contact on the surface of the substrate. Readout circuitry determines which of the inertial masses have deflected and translates this information to an output signal.

DESCRIPTION OF THE DRAWINGS

For a complete understanding of the invention, and the advantages thereof, reference is now made to the following description in conjunction with the accompanying drawings, in which.

DETAILED DESCRIPTION OF THE DRAWINGS

Figure 1:
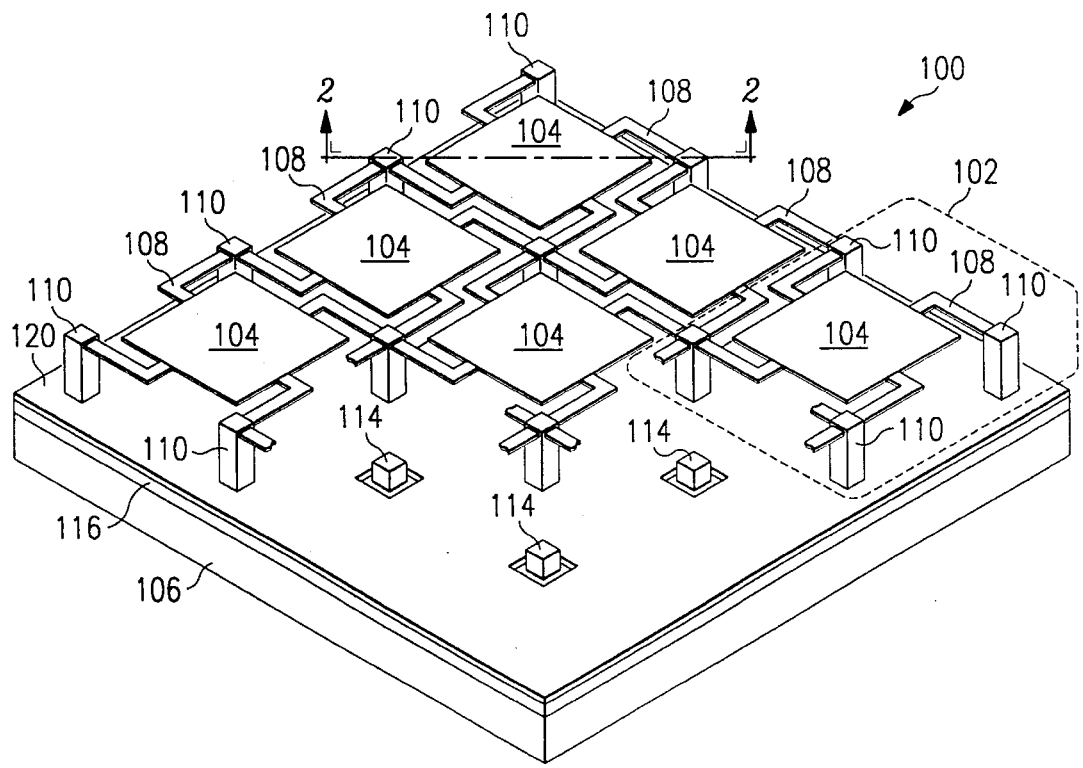
FIG. 1 is a perspective view of a portion of a typical accelerometer comprised of an array of deflection element according to one embodiment of the present invention.

A very small accelerometer based on the Flexure Beam Micromirror Device (FBMD) can be fabricated using standard semiconductor manufacturing techniques. FBMDs are taught in commonly assigned U.S. Pat. No. 4,954,789, entitled "Spatial Light Modulator" and issued Sep. 4, 1990. FIG. 1 is a perspective view of a portion of a typical accelerometer array 100 of flexure beam deflection elements 102. Each deflection element 102 in the array 100 is comprised of an inertial mass 104 suspended over a substrate 106 by four flexure hinges 108. Each hinge 108 has one end attached to the inertial mass 104 and the other end attached to the top of a support post 110. The substrate 106 beneath each deflection element 102 is typically silicon and may include circuitry 112 (shown in FIG. 2) built on, or into, the substrate 106 to enable reading the status of each deflection element 102. As will be discussed, this readout or addressing circuitry may take many forms but must be connected to a contact 114 on the surface of the substrate 106 beneath each inertial mass 104.

The design of the deflection element 102 substantially limits motion of the inertial mass 104 to a piston-like motion normal to the plane of the substrate 106. When the deflection element 102 is accelerated in a direction normal to the plane of the substrate 106, the inertial mass 104 will deflect either toward or away from the accelerometer substrate 106. As the inertial mass 104 deflects, the hinges 108 supporting the inertial mass 104 produce a restoring force that attempts to restore the inertial mass 104 to the undeflected position. This restoring force is dependent on the geometry of the hinges 108, the hinge 108 material, and the deflection of the inertial mass 104. If the inertial mass 104 is deflected toward the substrate 106, the restoring force will reach a maximum, called the threshold, when the inertial mass 104 touches the contact 114 on the substrate 106.

If the acceleration force is equal to or greater than the threshold, the inertial mass 104 will touch the contact 114 on the surface of the substrate 106, electrically shorting the inertial mass 104 and the contact 114. The inertial mass 104 and the contact 114 act like the two terminals of a switch which, when closed, allows the readout circuitry 112 to determine that the deflection element 102 is experiencing an acceleration force at least as great as the threshold of the deflection element 102. Because the response from each deflection element 102 does not indicate the magnitude of the acceleration, but rather if the acceleration is or is not equal to or greater than the threshold of the deflection element 102, the readout circuitry 112 must combine the response of several deflection elements 102 with different thresholds to determine the magnitude of an acceleration. A typical array 100 will contain deflection elements 102 that have a range of threshold values. For any accelerative force acting on the array that has a magnitude between the highest and lowest threshold value in the array, there is a set of deflection elements 102 that will be deflected by the force and a set of deflection elements 102 that will not be deflected.

Figure 2:
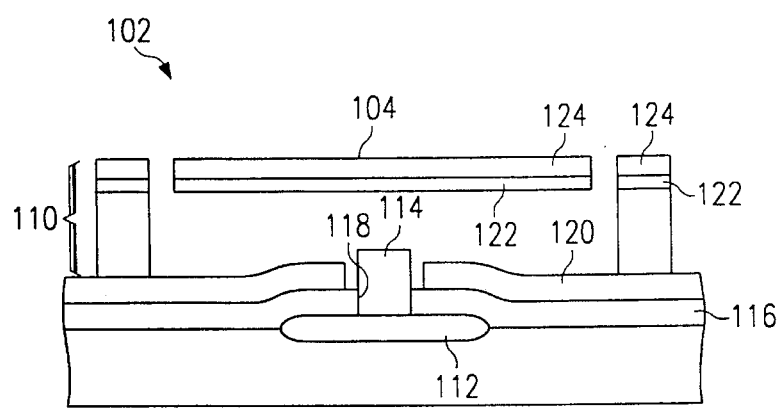
FIG. 2 is a cross sectional view of one of the deflection elements of the accelerometer array shown in FIG. 1.

A cross-sectional view, taken along line 115 of FIG. 1, of one deflection element 102 according to the present invention is shown in FIG. 2. The deflection element 102 is fabricated through a process similar to the FBMD fabrication sequence taught in the above referenced U.S. Pat. No. 4,954,789. The readout circuitry 112 is built on substrate 106 using standard CMOS, NMOS, or bipolar techniques. After the circuitry is completed, an insulator 116, typically silicon dioxide, is applied over the substrate 106 and readout circuitry 112. Vias 118 are formed through the insulator 116 prior to depositing one or more conductive layers, typically an aluminum alloy, that are patterned to form a contact 114 and a shield plane 120. The contact 114 is in communication with the readout circuitry 112 through the vias 118 in the insulator 116. Although the shield plane 120 is not required, in the absence of a shield plane 120 any voltage difference between the substrate 106 or readout circuitry 112 on the substrate and the inertial mass 104 will create an electrostatic attraction between the inertial mass 104 and the substrate 106 or readout circuitry 112. The electrostatic attraction will partially deflect the inertial mass 104 and effectively reduce the threshold of the deflection element 102. Biasing the shield plane 120 and the inertial mass 104 to the same potential will eliminate the attraction and increase the accuracy of the deflection element 102.

Many types of support posts 110 may be used including forms taught in commonly assigned U.S. Pat. No. 5,018,256, entitled "Architecture and Process for Integrating DMD with Control Circuit Substrates", issued May 28, 1991 and U.S. Pat. No. 5,061,049, entitled "Spatial Light Modulator and Method", issued Oct. 29, 1991, as well as aforementioned U.S. Pat. No. 4,954,789. The hinges 108 are patterned from a thin layer of hinge material 122, typically an aluminum or tungsten alloy, which is deposited onto the top of the support posts 110. A thick layer of inertial mass material 124, typically tungsten, is deposited on the hinge material 122 and patterned to form the inertial mass 104. The hinge and inertial mass layers 122, 124 may be individually etched as they are deposited or they may be etched simultaneously to form the hinges 108 and the inertial mass 104 of each deflection element 102. To keep the size of the inertial mass small, it is advantageous to use a heavy material for the inertial mass, but any material that can be deposited onto the hinge material may be used. Some support post 110 embodiments use hinge material 122 and inertial mass material 124 to form a hollow support post during the deposition steps.

The threshold of each deflection element 102, or the magnitude of force required to deflect the inertial mass 104 sufficiently to touch contact 118 is dependent on the mass of the inertial mass 104 and the compliance of the hinges 108. Therefore, changing either the mass of the inertial mass 104 or the compliance of the hinges 108 will achieve the desired effect of achieving a different threshold for each deflection element 102. The mass of each inertial mass 104 may be varied by changing either the material used, or the dimensions or the inertial mass 104 from one deflection element 102 to the next. Because it is more efficient to pattern a single metal layer to form all of the inertial masses 104 in an array, the material used to form the inertial masses 104 and the thickness of the material are typically held constant and the length and width of each inertial mass 104 are varied to cause a change in the mass. Alternatively, the compliance of the hinges 108 may be changed to adjust the threshold of each deflection element 102. Once again, because the hinge material for all deflection elements 102 in the array is most efficiently deposited in a single step, all of the hinges 108 in an array typically have a common thickness and are made of the same material. Therefore the hinge compliance will typically be adjusted by changing the hinge length and hinge width from one deflection element 102 to the next on a given array.

In the preferred embodiment, the inertial mass 104 consists of a square, approximately 50 μm on each side, of photolithographically patterned tungsten 1–2 μm thick. The square is supported on four sides by narrow aluminum hinges 108 approximately 50 μm long, 1 μm wide and 650 Å thick. Modelling this embodiment indicates that sensitivity to accelerations in the range 1 m/s$^2$ to 100 m/s$^2$ can be obtained depending on the thickness of the tungsten inertial mass 104.

Many different circuit configurations may be used to implement the readout circuitry 112 for monitoring the position of the inertial mass 104 of each deflection element 102. As discussed above, the inertial mass 104 and the contact 118 form the two terminals of a switch. Any circuit that is capable of detecting whether or not the switch is closed and outputting a signal based on the state of the switch may be used for the readout circuit 112. Readout circuitry 112 falls into one of two broad classes depending on the method used to read the status of an array of deflection elements 102. The first class, simultaneous circuits, reads the status of all deflection elements 102 in an array simultaneously. The second class, sequential circuits, individually scans the status of each deflection element 102 in the array. Simultaneous readout circuitry typically has a shorter update cycle but requires more circuitry to implement.

Figure 3:
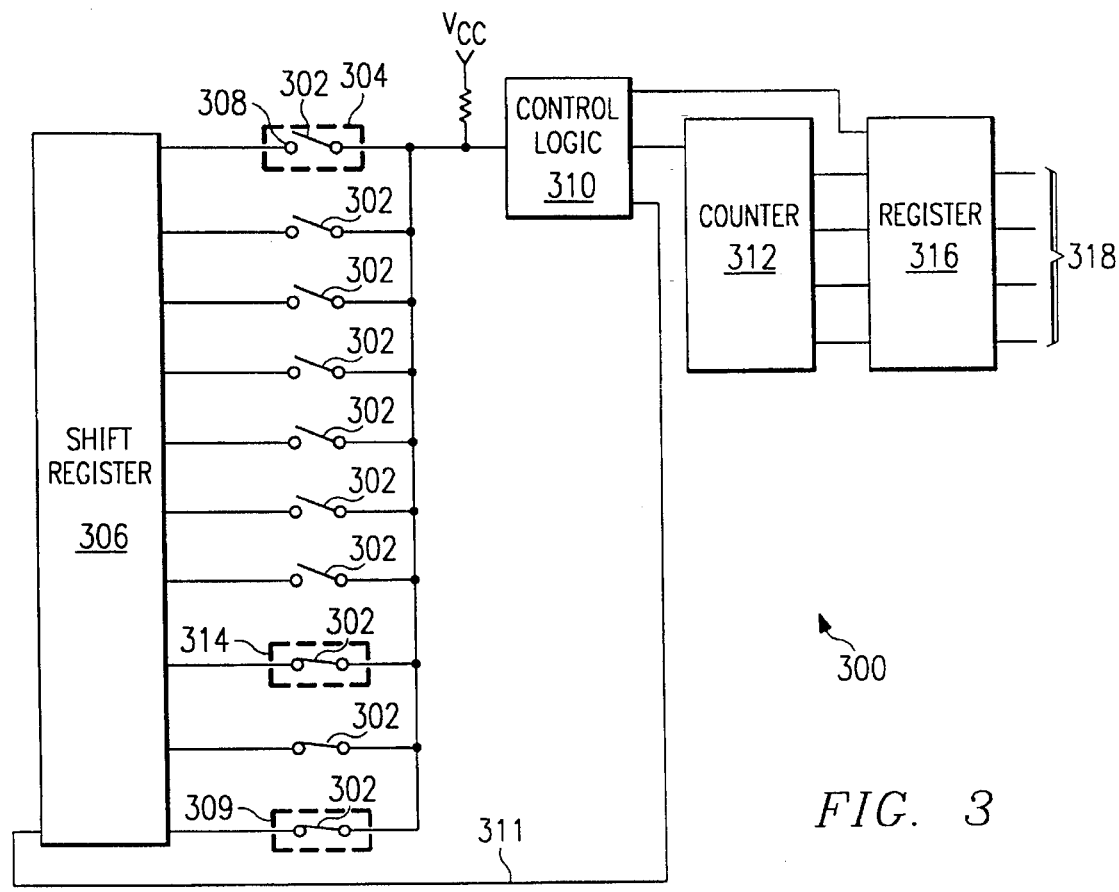
FIG. 3 is a schematic diagram of a first embodiment of a sequential readout circuit for monitoring the status of an array of deflection elements according to the present invention.

FIG. 3 shows a schematic diagram for one embodiment of an accelerometer array and sequential readout circuit 300. As shown in FIG. 3, the inertial masses 302 of each deflection element 304 in an accelerometer array are electrically connected. This is because the metal support post at each corner of each deflection element typically connects the metal hinges from four adjacent deflection elements. Although the accelerometer array may be designed to electrically isolate the deflection elements, it typically simplifies the readout circuitry if all of the inertial masses 302 are interconnected. In FIG. 3, a shift register 306 is used to sequentially drive a logic low signal onto the contact 308 of each deflection element, starting with the deflection element with the highest threshold 304, and continuing toward the deflection element with the lowest threshold 309. Because the inertial masses 302 of all of the deflection elements are connected, the shift register 306 must have open/collector outputs. Control logic 310 decrements a counter 312 each time the shift register 306 is clocked via line 311. When the shift register 306 pulses a deflection element that is deflected 314, the output signal from the shift register 306 passes through the deflected element to control logic 310. The control logic 310 causes the output of the counter 312, which represents the magnitude of the acceleration force on the accelerometer array, to be loaded into a register 316. The output value 318 is held in register 316 while the counter 312 and the shift register 306 are reset and the next measurement is taken. The readout circuit 300 may be modified to count up while polling the deflection elements in the opposite order.

Figure 4:
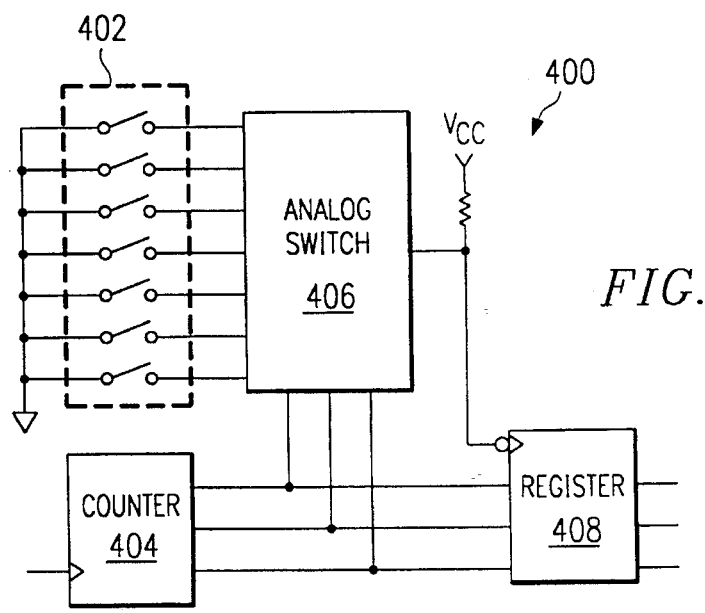
FIG. 4 is a schematic diagram of a second embodiment of a sequential readout circuit for monitoring the status of an array of deflection elements according to the present invention.

A second sequential circuit 400 for reading the output of an accelerometer array 402 is shown in FIG. 4. In FIG. 4 the output of a counter 404 is used to control an analog switch 406 which sequentially passes the output of each deflection element in array 402 to the clock input of a register 408. When a deflected inertial mass is selected, the register 408 is loaded with the output of the counter 404, which represents the magnitude of the acceleration force on the accelerometer array 402. To prevent false clocks from being driven to register 408, the analog switch 406 should be a make-before-break switch. Minor circuit modifications allow the polling sequence to be reversed or the substitution of a digital multiplexer for the analog switch 406.

Figure 5:
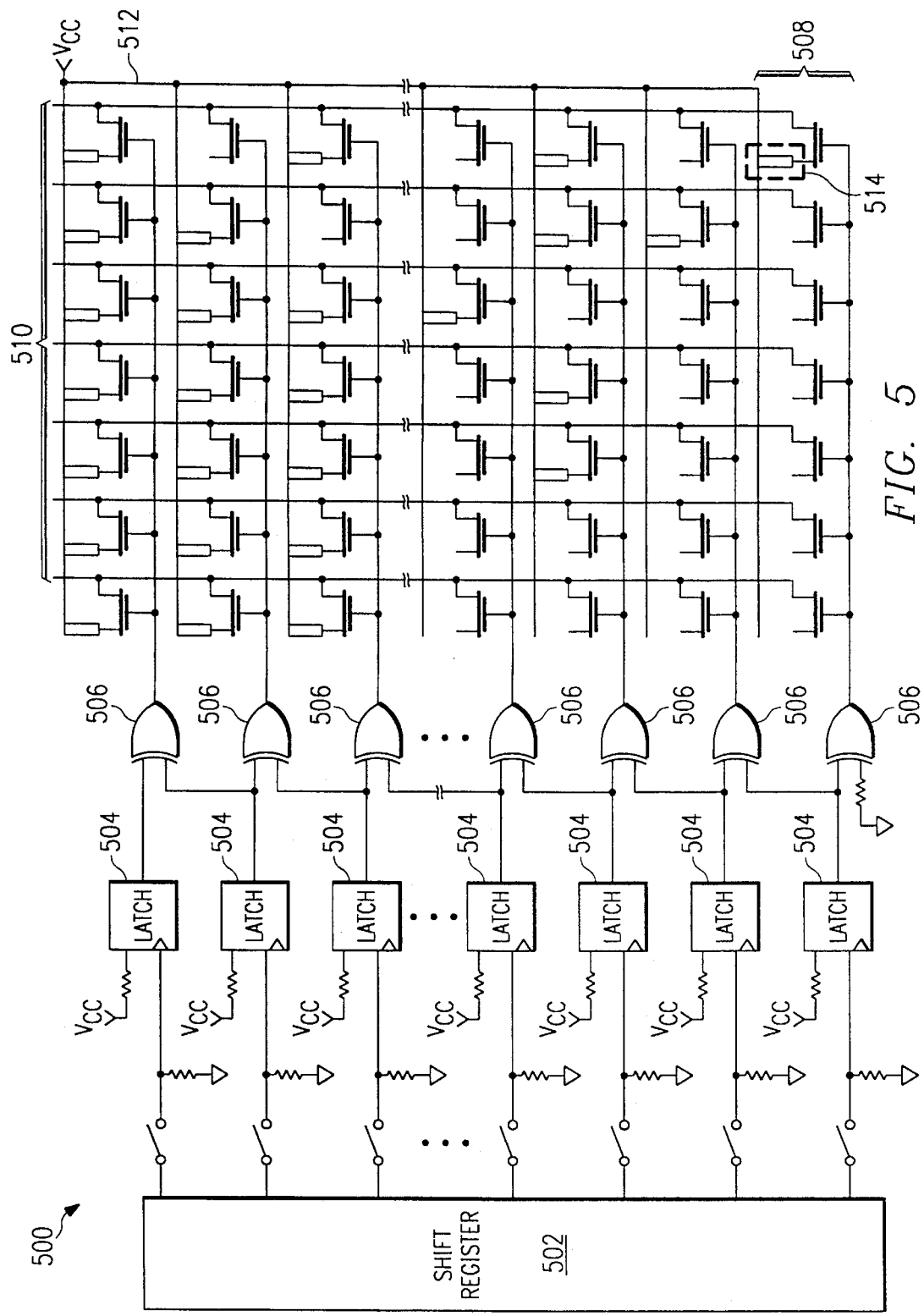
FIG. 5 is a schematic diagram of a third embodiment of a sequential readout circuit for monitoring the status of an array of deflection elements according to the present invention.

A third sequential readout circuit 500 is shown in FIG. 5. The circuit of FIG. 5 uses a shift register 502 to strobe each of the deflection elements in an accelerometer array in order of their threshold value from lowest to highest. When an output of the shift register 502 strobes a deflected inertial mass, a signal is loaded into the corresponding latch 504. The outputs of the latches 504 are compared by an array of exclusive-or gates 506. Any acceleration force acting on the accelerometer array will deflect all of the elements with a threshold below the magnitude of the acceleration and none of the elements with a threshold above the magnitude of the acceleration. Therefore, there will be a transition point somewhere in the array between a first set of deflected inertial masses and a second set of undetected inertial masses. When the exclusive-or array compares the outputs of each pair of deflection elements having adjacent thresholds, only one exclusive-or gate 506 will have an active output. The active output from an exclusive-or gate will turn on a row of transistors 508 and enable a voltage signal to pass through some of the transistors to a set of bitlines 510. An encoding scheme is implemented by selecting which transistors are connected to both a bitline and the voltage supply line 512. A word representing the encoded acceleration value is output on the bitlines 510.

The connection between the voltage supply line 512 and each transistor may be a programmable fuse 514. The fuses 514 may be used by the either the manufacturer or user of the accelerometer array to calibrate the output of the accelerometer array. Alternatively, the interconnections may be predetermined and only the transistors that are actually connected to both the bitlines and the voltage supply lines included in the array.

Figure 6:
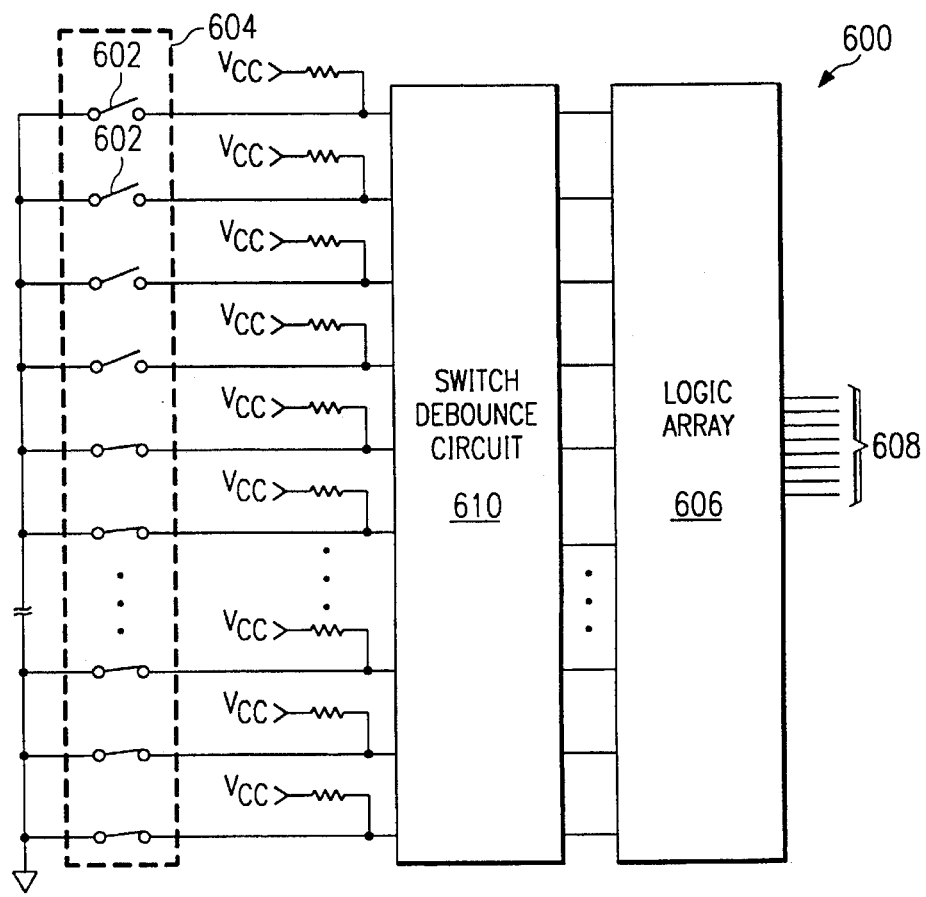
FIG. 6 is a schematic diagram of a first embodiment of a simultaneous readout circuit for monitoring the status of an array of deflection elements according to the present invention.

An example of a simultaneous readout circuit 600 according to one embodiment of this invention is shown in FIG. 6. In FIG. 6, a voltage signal is applied simultaneously to all of the inertial masses 602 in an array of deflection elements 604. The output from each deflection element in the array 604 is input into a logic array 606 designed to translate any set of inputs into an output word 608. The logic array 606 may either be hard-wired during the fabrication of the device, or user-programmable. Whereas the circuits shown in FIGS. 3–5 polled the array until the first deflected element or transition point was located, the circuit 600 of FIG. 6 constantly checks the condition of every deflection element in the array 604. This allows the logic array to be designed with at least some degree of fault tolerance. For example, if an array with 255 deflection elements had the 100 elements with the lowest threshold deflected, and the single element with the 50th highest threshold was also deflected, the logic array may be designed to assume that the reading from the element with the 50th highest threshold was erroneous, allowing the accelerometer array to output valid measurements even though some of the deflection elements were inoperable.

Because the deflection elements are essentially switches, a switch debounce circuit 610 may be used to eliminate the effects of switch bounce. Although not shown in FIGS. 3–5, a switch debounce circuit may be used for any readout circuit configuration.

Figure 7:
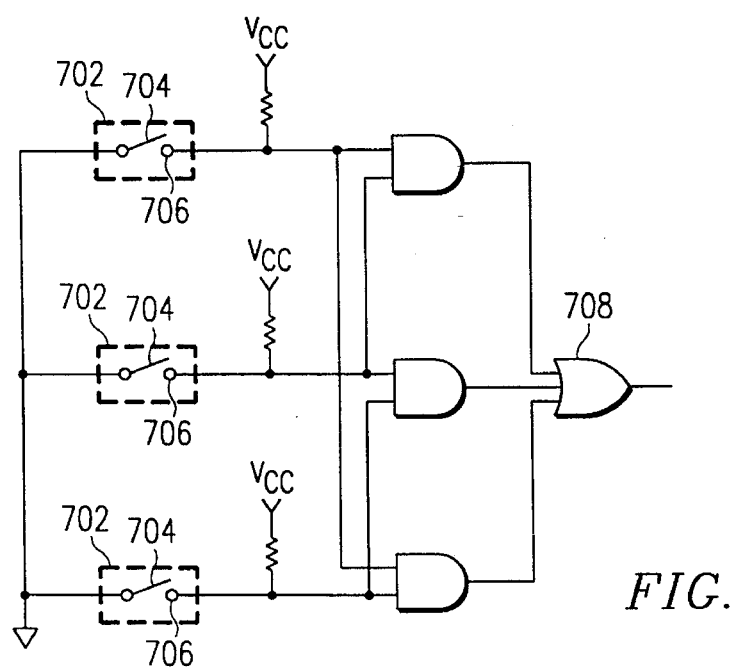
FIG. 7 is a schematic diagram of one embodiment of a circuit that increases the fault tolerance of an accelerometer array by allowing three identical deflection elements to replace a single deflection element.

One method of making a fault tolerant accelerometer array that may be used with any of the previous readout circuits includes using redundant deflection elements in the array. FIG. 7 shows three deflection elements 702, each with an identical threshold, that are connected to give a single output that is indicative of the status of a majority of the deflection elements 702. If any two of the inertial masses 704 are touching their respective contacts 706, the output of gate 708 will be active. This "majority rule" method allows the readout circuitry to output the correct acceleration value even if one deflection element from each group of three deflection elements is either permanently deflected or unable to deflect. Additional deflection elements may be used with a corresponding increase in the level of redundancy.

Another method of making a fault tolerant accelerometer array uses a microprocessor to constantly monitor the state of each deflection element and encode an output word for the array. The microprocessor may include a memory map to indicate the status of each deflection element. If a deflection element is consistently deflected when several other deflection elements with lower thresholds are not deflected, or if the deflection element is not deflected when several others with a higher threshold are deflected, the microprocessor may assume that the deflection element is not functioning properly and change the memory map to indicate a failure. The microprocessor may use the memory map to disregard the outputs from the failed deflection elements in the array.

Thus, although there has been described to this point a particular embodiment for an accelerometer and readout circuitry, it is not intended that such specific references be considered as limitations upon the scope of this invention except in-so-far as set forth in the following claims.

What is claimed is:

1. An accelerometer array comprising:
    a plurality of deflection elements, each one of said deflection elements comprising
        an inertial mass, and
        at least one hinge supporting said inertial mass in a normal position, deflection of said inertial mass occurring as movement of said inertial mass in a first direction out of said normal position by a force applied thereto, said movement storing energy in said at least one hinge,
        at least one component selected from the group consisting of said inertial mass and said at least one hinge being different from one of said deflection elements to another in said accelerometer array so that said force applied to said inertial masses by simultaneous acceleration of said plurality of deflection elements deflects some of said inertial masses, respective discrete ranges of acceleration causing the deflection of different respective combinations of said inertial masses;
    an electrical circuit for detecting which combinations of said inertial masses deflect and for producing a sensible output representative thereof; and
    a shield plane between said electrical circuit and said plurality of deflection elements.

2. The accelerometer array of claim 1 wherein said electrical circuit is a CMOS circuit.

3. The accelerometer array of claim 1 wherein said electrical circuit comprises a contact electrode associated with each one of said deflection elements, said electrical circuit detecting contact between said inertial mass and said associated contact electrode.

4. The accelerometer array of claim 3 wherein said contact electrode is an aluminum alloy.

5. The accelerometer array of claim 1 wherein said at least one hinge is an aluminum alloy.

6. The accelerometer array of claim 1 wherein said at least one hinge is a tungsten alloy.

7. The accelerometer array of claim 1 wherein said inertial mass is an aluminum alloy.

8. The accelerometer array of claim 1 wherein said inertial mass is a tungsten alloy.

* * * * *